US007282690B2

(12) United States Patent
Smith et al.

(10) Patent No.: US 7,282,690 B2
(45) Date of Patent: Oct. 16, 2007

(54) DISPLAY OF INDICATOR LIGHTS IN NIGHT VISION DEVICES USING FIBER OPTIC SCREEN

(75) Inventors: William Allen Smith, Daleville, VA (US); David A. Richards, Roanoke, VA (US); Charles D. Willey, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/315,519

(22) Filed: Dec. 22, 2005

(65) Prior Publication Data

US 2007/0145245 A1    Jun. 28, 2007

(51) Int. Cl.
*H01J 31/50* (2006.01)
(52) U.S. Cl. .............................. 250/214 VT; 250/207; 313/525
(58) Field of Classification Search ................ 250/207, 250/214 VT, 227.11, 333, 368; 313/524, 313/525, 528; 385/115, 120
See application file for complete search history.

(56) References Cited

U.S. PATENT DOCUMENTS 3,933,410 A    1/1976    Milton 5,254,852 A    10/1993   Filipovich et al.
5,572,034 A *  11/1996   Karellas ..................... 250/368

FOREIGN PATENT DOCUMENTS

WO    WO 2004/083921 A1    9/2004

OTHER PUBLICATIONS

International Search Report Appln. No. 06126065.9-2217 dated Apr. 23, 2007.

* cited by examiner

*Primary Examiner*—Kevin Pyo
(74) *Attorney, Agent, or Firm*—RatnerPrestia

(57) ABSTRACT

A night vision device includes an image intensifier tube and a fiber optic screen disposed in operative relationship to each other. The fiber optic screen includes a longitudinal bundle of multiple optical fibers, where the bundle has an outer surface. A groove is formed in the fiber optic screen and extends transversely to the longitudinal bundle. An indicator is positioned adjacent to the outer surface of the bundle and is proximate to the groove, where the groove is configured to redirect light emitted from the indicator for viewing by a user. The groove may be formed circumferentially around a portion of the outer surface of the longitudinal bundle. The groove includes a surface of end portions of multiple cut optical fibers, and the groove is configured to redirect the light emitted from the indicator toward the user by way of the end portions of the multiple cut optical fibers.

20 Claims, 4 Drawing Sheets

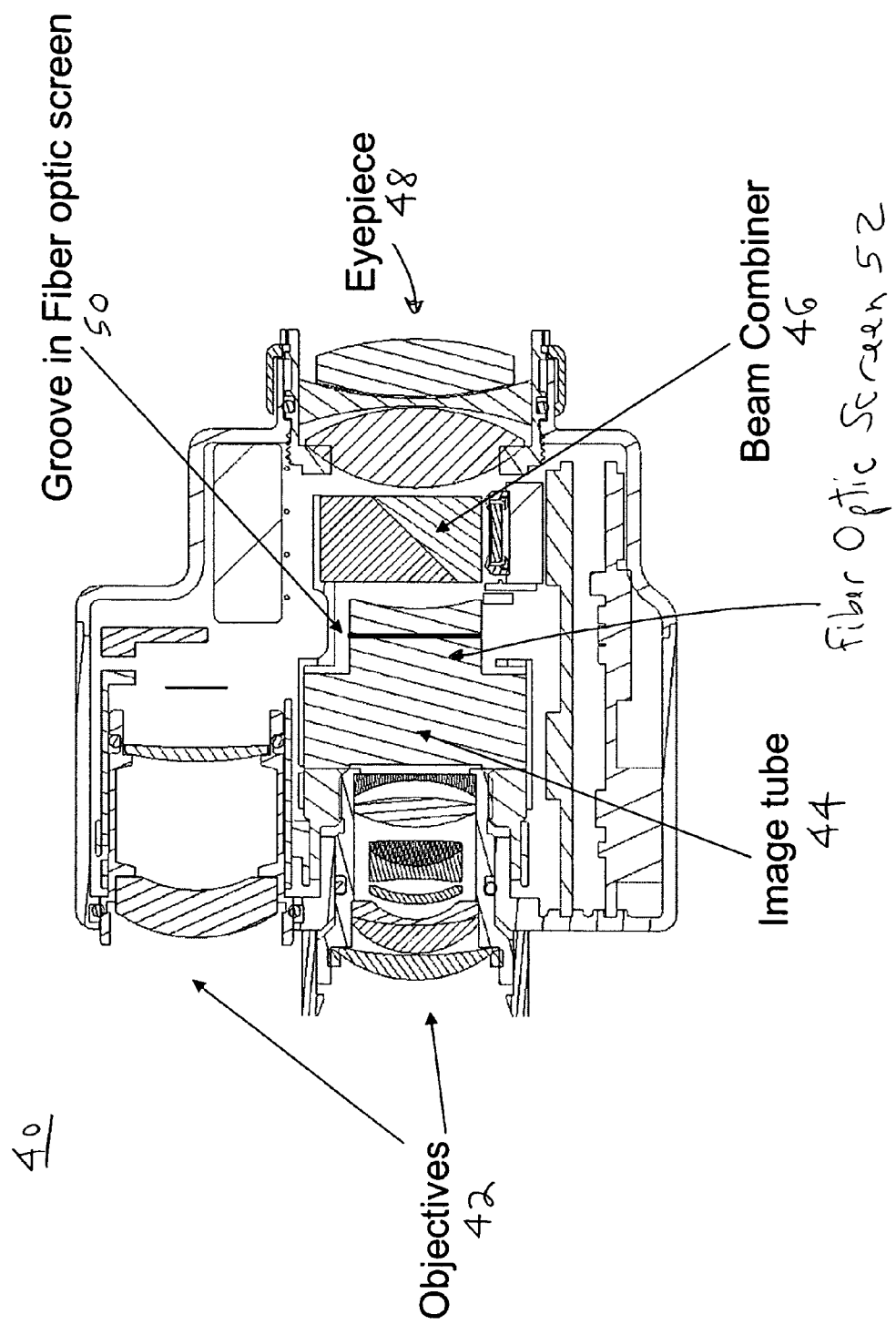

DISPLAY OF INDICATOR LIGHTS IN NIGHT VISION DEVICES USING FIBER OPTIC SCREEN

TECHNICAL FIELD

The present invention relates, in general, to the field of night vision devices. More specifically, the present invention relates to the display of indicator lights, such as "low battery", into the field-of-view of an eyepiece of a night vision device using a fiber optic screen.

BACKGROUND OF THE INVENTION

Image intensifier devices multiply the amount of incident light they receive and provide an increase in light output, which can be supplied either to a camera or directly to the eyes of a viewer. Image intensifiers are constructed for a variety of applications and hence vary in both shape and size. These devices are particularly useful for providing images from dark regions and have both industrial and military applications. For example, image intensifiers are used in night vision goggles for enhancing the night vision of aviators and other military personnel performing covert operations. They are employed in security cameras and in medical instruments to help alleviate conditions such as retinitis pigmentosis (night blindness).

Image intensifiers include active elements, support elements and supply elements. The active elements include the photo-cathode (commonly called simply "cathode"), micro-channel plate (MCP), fiber optic screen (screen), and getter. The cathode detects a light image and changes the light image into an electron image. The MCP amplifies the electron image and the screen changes the electron image back to a light image. The getter absorbs gas which is generated during operation of the tube.

The support elements comprise the mechanical elements which physically support the active elements of the tube. In a standard tube these support elements are the vacuum envelope (known as the body), input faceplate (sometimes also called "cathode"), and the output faceplate or fiber-optic (also called "screen").

The supply elements in the tube include the chrome contact that is deposited on the faceplate to the cathode, the screen aluminum contact which is deposited on the fiber optic or output faceplate, and the metalizing on the MCP glass. In addition the metal parts in the body assembly also provide electrical contact.

The fiber optics direct the image generated by the screen to a convenient position so that the system optics can properly direct the image to the ocular plane.

Three major components of image intensifier tubes are the photocathode, fiber optic screen (anode), and MCP disposed between the photocathode and anode. These three components are positioned within the evacuated housing or vacuum envelope, thereby permitting electrons to flow from the photocathode through the MCP and to the anode. In order for the image intensifier tube to operate, the photocathode and anode are normally coupled to an electric source whereby the anode is maintained at a higher positive potential than the photocathode. Similarly, the MCP is biased and operates to increase the density of the electron emission set forth by the photocathode. Furthermore, since the photocathode, MCP and anode are all held at different electrical potentials, all three components are electrically isolated from one another when retained with the vacuum housing.

Power is provided to the photocathode, MCP and anode by a high voltage power supply, often in the form of an annulus. The power supply is usually axially aligned to surround the image tube.

It is desirable to display an indication of "low battery" and/or an indication of "IR illuminator ON" to a user of a night vision device. This may be done by use of a low brightness light placed on the exterior of the night vision device to alert the user of the status of the power supply and/or other components. An LED may also be mounted at a convenient location on the exterior housing surface of the night vision device.

Use of an indicator light on the outside surface of the night vision device, however, has shortcomings. In order to view the indicator light, the user must look away from the field-of-view of the eyepiece, and look at the indicator light. After looking at the indicator light, the user may then resume viewing the field-of-view through the eyepiece, but likely only after a time consuming eye-focusing adjustment. In addition, an indicator light mounted on the exterior surface of the night vision device may potentially give away the user's position.

There exists a need for an improved approach to visually informing the user of the status of his night vision device. The present invention addresses such need.

SUMMARY OF THE INVENTION

To meet this and other needs, and in view of its purposes, the present invention provides a night vision device including an image intensifier tube and a fiber optic screen disposed in operative relationship to each other. The fiber optic screen has a longitudinal bundle of multiple optical fibers and the bundle has an outer surface. A groove is formed in the fiber optic screen and extends transversely to the longitudinal bundle. An indicator is positioned adjacent to the outer surface of the bundle and proximate to the groove, where the groove is configured to redirect light emitted from the indicator for viewing by a user. The groove may be formed circumferentially around a portion of the outer surface of the longitudinal bundle. The groove may also be formed circumferentially around a complete perimeter of the outer surface of the longitudinal bundle. The groove includes a surface of end portions of multiple cut optical fibers, and the groove is configured to redirect the light emitted from the indicator toward the user by way of the end portions of the multiple cut optical fibers. The indicator may be positioned radially away from the outer surface of the fiber optic screen by approximately 1-2 times the value of an outer radial portion of the longitudinal bundle which is disposed outside of the field-of-view of the image.

Another embodiment of the present invention is a night vision device including a photocathode and an anode configured to provide an image to a user, the anode including a fiber optic screen for channeling light from the image toward an eyepiece of the user. The fiber optic screen includes a longitudinal bundle of multiple optical fibers, the optical fibers providing the channeling of the light. A groove is formed in the fiber optic screen and extends transversely to the longitudinal bundle. An indicator is positioned adjacent to the outer surface of the bundle and is proximate to the groove, where the groove is configured to redirect light emitted from the indicator toward the eyepiece for viewing by the user. The groove includes a surface of end portions of multiple cut optical fibers, and the groove is configured to redirect the light emitted from the indicator toward the user by way of the end portions of the multiple cut optical fibers.

The indicator may include two or more light emitting diodes (LEDs), and the LEDs are spaced circumferentially around the groove, which is formed circumferentially around the fiber optic screen.

Yet another embodiment of the present invention is a method of providing an alert to a user of a night vision device, where the night vision device includes a fiber optic screen for directing light from an image toward the user, and a power supply for powering the night vision device. The method includes the steps of: (a) configuring the power supply for assembly with the fiber optic screen; (b) placing at least one indicator to provide the alert at a surface of the power supply; (c) cutting a groove in the outer surface of the fiber optic screen; and (d) aligning, during assembly, the groove with the indicator so that light emitted from the indicator impinges into the groove; wherein after alignment of the groove with the indicator, the light impinging into the groove is redirected by the fiber optic screen toward the user. Step (c) may include cutting the groove transversely to a longitudinal dimension of the fiber optic screen, and cutting the groove to a radial depth that is smaller than or equal to a radial width of an outer radial portion of the fiber optic screen, the outer radial portion including a bundle of multiple optical fibers that are outside a field-of-view of the night vision device.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 4 is a cross section of an exemplary night vision device, showing a transverse groove cut into the fiber optic screen, in accordance with an embodiment of the present invention.

DETAILED DESCRIPTION OF THE INVENTION

Use of an indicator outside of the field-of-view of the eyepiece prevents continuous viewing of the indicator and may potentially give the user's position away. Mounting the LED so that it may be in the field-of-view of the eyepiece complicates assembly and repair and limits the space available for other optical components. As will be explained, LEDs are oriented onto an exposed section of the fiber optic screen of an image tube, such that the light is transferred to a viewable portion of the fiber optic screen by use of a shallow groove which is cut into the side of the fiber optic. This approach advantageously provides indicators on the edge of the field-of-view of the image. The portion of the fiber optic screen, which is used for transferring the light from the indicator to the viewer is not used in displaying an image from the screen to the eyepiece. Consequently, no information of the image being viewed is lost. In addition, assembly of the packaged image tube and power supply into a night vision device is simplified, because the indicator is integral to the assembly before installation.

Figure 1:
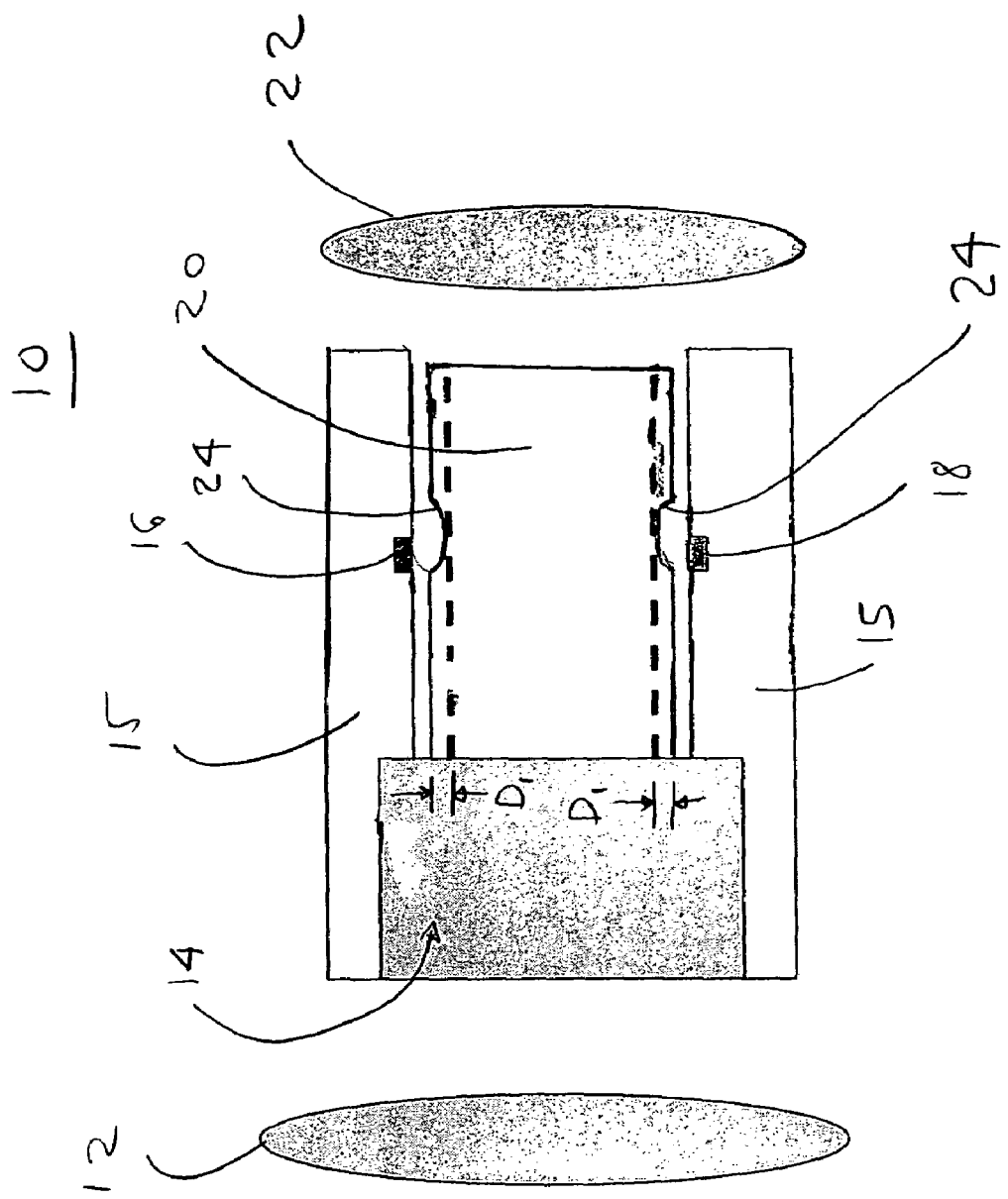
FIG. 1 is a schematic view of a night vision device, showing a groove cut into a fiber optic screen, in accordance with an embodiment of the present invention.

Referring to FIG. 1, there is shown a schematic view of night vision device 10. It will be appreciated, that night vision device 10 is of the type currently manufactured by ITT Night Vision of Roanoke, Va. At the entrance side of night vision device 10, objective lens 12 collects low intensity light from a scene and transmits it to image intensifier tube 14. Image intensifier tube 14 amplifies the light received from objective lens assembly 12 and transmits the intensified light to fiber optic screen 20, which provides an image conduit for the light to be injected from the side of image intensifier tube 14 into a direction at the other end of the fiber optic screen. It will be appreciated that fiber optic screen 20 includes multiple fibers that are fused together to form the conduit channel for the light. Although not shown, it will be appreciated that fiber optic screen 20 may be twisted or bent so that it can provide almost any desired path between the image intensifier tube and the eyepiece 22.

As shown, the output side of fiber optic screen 20 is coupled to eyepiece 22 which provides a focused image to the user. The user thus may view an intensified image which is channeled from the input side of the night vision device, at objective lens 12 to the output at eyepiece 22. As known, the image may be inverted or may be of a different size then the image having entered the night vision device.

Also shown in FIG. 1 is power supply 15 which in the figuration shown in FIG. 1 is of a ring type that surrounds image intensifier tube 14 and fiber optic screen 20. In the exemplary embodiment shown power supply 15 includes two indicators 16 and 18 positioned at the surface of annular power supply 15 and positioned to be adjacent to the outer cylindrical surface of fiber optic screen 20. It will be appreciated that more than two indicator lights may be positioned around the inner surface of annular power supply 15, as may be necessary.

A shallow groove is cut into the outer portion of fiber optic screen, designated as groove 24. Groove 24 completely encompasses the outer portion of fiber optic screen 20. By cutting a shallow groove in the outer portion of fiber optic screen 20 light radiating from indicators 16 and 18, which are integral to power supply 15 may then be transferred to the user's end by way of the fiber optic channels provided within fiber optic screen 20. It will be appreciated that groove 24 does not interfere with the portion of the fiber optic screen which is used for displaying the viewed scene in the user's field-of-view. As will be explained, the outer portion of fiber optic screen 20 denoted by a width of $D_1$, is defined as the unused portion of fiber optic screen 20. The portion of fiber optic screen 20 which is exterior to links $D_1$ is defined as the useful portion of fiber optic screen 20.

Figure 2:
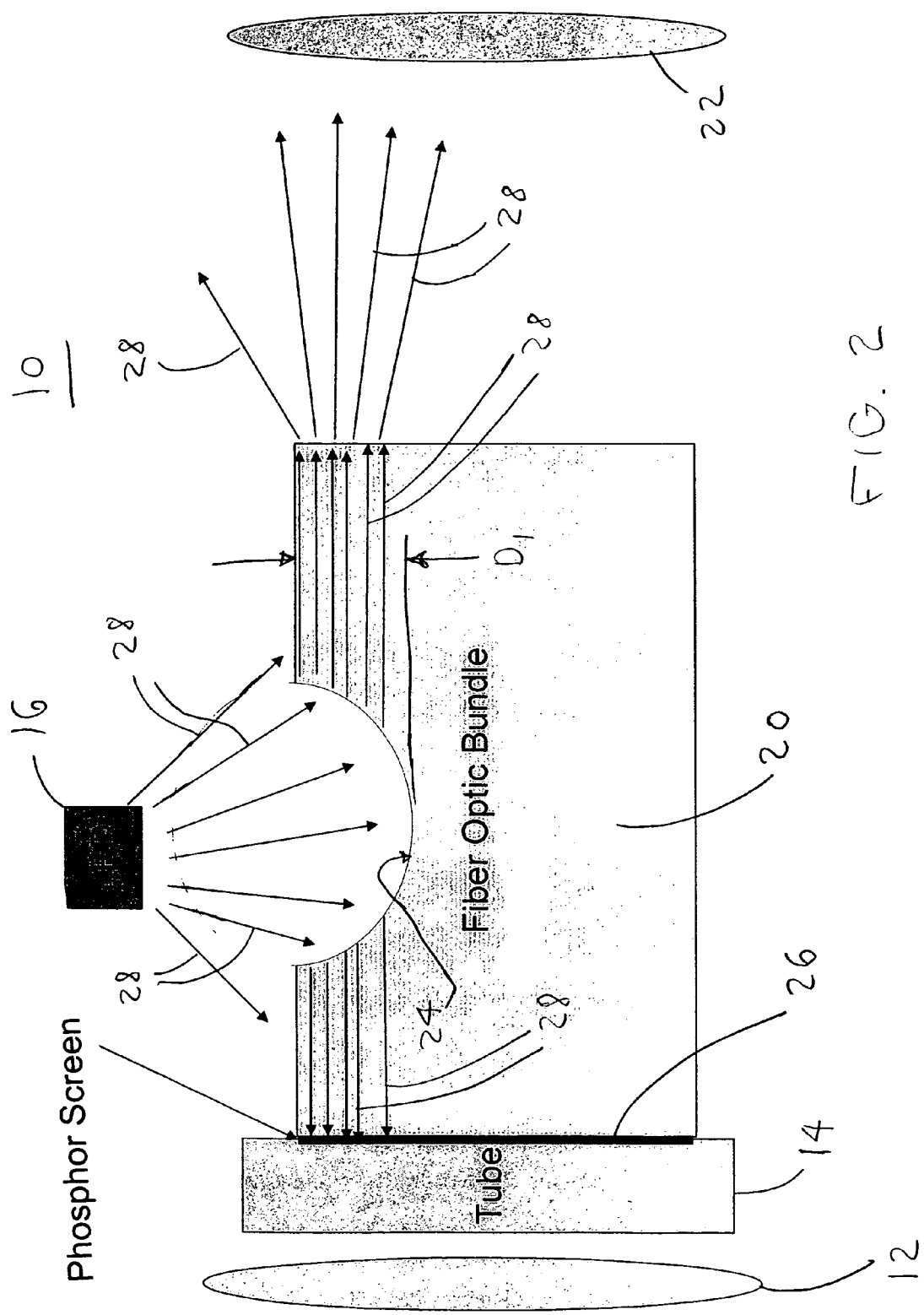
FIG. 2 is an exaggerated schematic view of a night vision device, depicting a light emitting diode (LED) emitting light towards the groove in the night vision device, which redirects the emitted light toward an eyepiece used by a viewer, in accordance with an embodiment of the present invention.

Referring next to FIG. 2, there is shown the same night vision device 10. As shown, the front end of night vision device 10 includes objective lens 12 and the back end of the night vision device includes eyepiece 22. Positioned between objective lens 12 and eyepiece 22 are image intensifier tube 12 and fiber optic screen 20 the input side of fiber optic screen 20 includes a layer of phosphor, which provides an image screen for the field-of-view being imaged by objective lens 12. Phosphor screen is generally designated as element 26.

It will be understood that for the sake of explanation, fiber optic screen 20 has been exaggerated in showing its fiber optic having been bundled to form fiber optic screen 20. A groove is shown in fiber optic screen 20, generally designated by element 24. The groove has a depth of $D_1$, as shown. An indicator, for example LED 16, which is part of power supply 15 (shown in FIG. 1) is positioned adjacent to groove 24. For the sake of clarity the groove as shown in FIG. 1 which is of annular shape, has been omitted from FIG. 2.

The light emanating from LED 16, indicated by light rays 28 impinge on groove 24 and enter a portion of the fiber optics that are in the fiber optic bundle comprising fiber optic element 20. The fiber optics within the outer portion of fiber optic screen 20, having a width of $D_1$, channel the impinging light rays 28 towards both ends of fiber optic screen 20. As shown, some of the light rays 28 are channeled toward the front end of fiber optic screen 20 and are stopped by phosphor screen 26. On the other hand, some of light rays 28 are channeled towards the back end of fiber optic screen 20 for eventual exit from fiber optic screen 20 and for transmission onto eyepiece 22. A user viewing an image through eyepiece 22 would easily see the indication provided by LED 16.

Figure 3A:
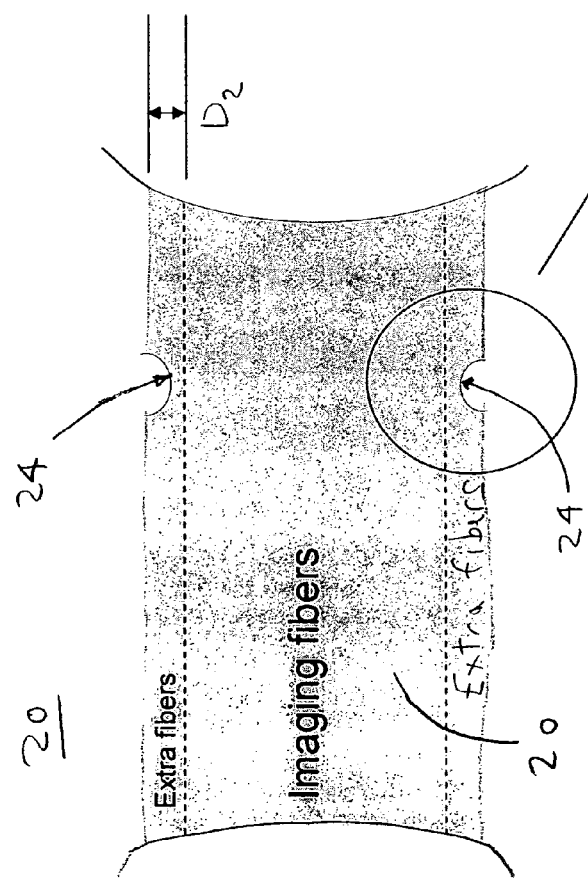
FIG. 3A is an exaggerated schematic view of the fiber optic screen of FIG. 1, showing the groove which is cut into the outer portion of the fiber optic screen, in accordance with an embodiment of the present invention.
Figure 3B:
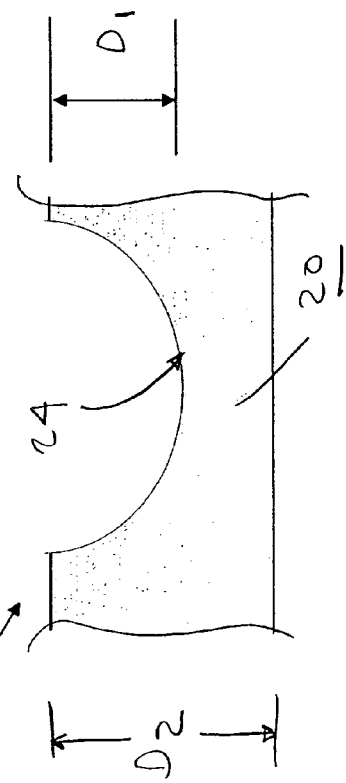
FIG. 3B is a magnified view of the groove which is cut into the extra fibers of the fiber optic screen shown in FIG. 3A.

Referring next to FIG. 3A and FIG. 3B there is shown groove 24 in relations to fiber optic bundle 20. As shown, fiber optic screen 20 includes an inner portion having active imaging fibers and a portion, denoted as extra fibers which are outside of the active imaging portion viewed by a user.

The outer portion of fiber optic screen 20, denoted by extra fibers, has a width of $D_2$. The groove portion designated 24 which is cut into the extra fibers has a depth of $D_1$. It will be appreciated that the groove may have a depth of $D_1$ which may be almost as width $D_2$, as shown in FIG. 3B. The shape and depth of groove 24 is not critical.

As discussed above, the shape of the cut of groove 24 is not critical. In an exemplary embodiment, the depth of groove 24 may be approximately 0.5 mm ($D_1$). The width of the extra fibers portion may be of approximately 1 mm ($D_2$).

It will be understood that groove 24 need not be annular in shape and completely envelope fiber optic element 20. If, for example, only one LED is required for indication to the user then the groove may just be a smaller groove and need not completely surround fiber optic element 20. If, on the other hand, it is desirable to have two or three or more indicators, then it is probably faster and less expensive to provide an annular groove 24 that completely surrounds the fiber optic screen 20. The indicators may then be positioned around the fiber optic screen and be housed in the power supply at a location or locations that are adjacent to groove 24. Indicators 4 providing an alert to the user, may be of a type other then LEDs. As shown in FIG. 1, for example, indicator 16 may be an IR illuminator indicator and indicator 18 may be a low battery indicator.

Referring to FIG. 2, in an exemplary embodiment, LED 16 may be positioned approximately 1-2 mm away from the outer surface of fiber optic screen 20. Such positioning, is adequate for allowing the light that is emitted from LED 16 to be channeled into the extra fibers and be transmitted to the user.

In another exemplary embodiment LED 16 may be red in color, while LED 18 may be yellow in color.

In an alternate embodiment, although it is not a preferred approach, groove 24 may extend deeper than the width of the width of extra fibers of fiber optic screen 20. This embodiment would be functional and provide re-channeling of the LED indicators to the user. Of course, such embodiment would interfere with the field-of-view that is being imaged by objective lens 42 and being amplified by image intensifier tube 14.

Referring next to FIG. 4, there is shown a cross section of an exemplary night vision device 40. As shown, on the entrance side of night vision device 40 there are several objective lenses, generally indicated as 42. At the exit side of night vision device 40 there are several lenses used as an eyepiece for viewing by a viewer, the eyepiece generally designated by 48. Objective lens 42 collects low intensity light from a scene and transmits it to image intensifier tube 44. The image intensifier tube intensifies the light received from objective lens 42 and transmits the intensified light onto beam combiner 46. Parallel light entering objective lens 42 at the top portion of night vision device 40 is collimated and transmitted to beam combiner 46. Beam combiner 46 combines both rays from top of objective lens 42 and the bottom objective lens 42 and forwards it to the viewer by way of eyepiece 48.

A groove has been cut in fiber optic screen 52, the groove generally being designated by element 50. Although not shown in FIG. 4, an indicator, for example, such as LED 16 or LED 18 (FIG. 1) which may be part of the outer surface of power supply 15, may be positioned to be adjacent to groove 50, as shown in FIG. 2 by LED 16 being adjacent to groove 24 (FIG. 2).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A night vision device comprising
    an image intensifier tube and a fiber optic screen disposed in operative relationship to each other,
    the fiber optic screen including a longitudinal bundle of multiple optical fibers, the bundle having an outer surface,
    a groove formed in the fiber optic screen and extending transversely to the longitudinal bundle, and
    an indicator positioned adjacent to the outer surface of the bundle and proximate to the groove,
    wherein the groove is configured to redirect light emitted from the indicator for viewing by a user.
2. The night vision device of claim 1 wherein
    the groove is formed circumferentially around a portion of the outer surface of the longitudinal bundle.
3. The night vision device of claim 1 wherein
    the groove is formed circumferentially around a complete perimeter of the outer surface of the longitudinal bundle.
4. The night vision device of claim 1 wherein
    the indicator is integral to a power supply housing and
    the indicator is positioned to emit light to the outside of the power supply housing and toward the groove.
5. The night vision device of claim 1 wherein
    the indicator is positioned radially further away from a center of the longitudinal bundle and radially adjacent to the groove.
6. The night vision device of claim 1 including
    an eyepiece, disposed in longitudinal alignment with the bundle of optical fibers, for receiving the redirected light emitted from the indicator.

7. The night vision device of claim 1 wherein
the groove includes a surface of end portions of multiple cut optical fibers, and
the groove is configured to redirect the light emitted from the indicator toward the user by way of the end portions of the multiple cut optical fibers.

8. The night vision device of claim 1 wherein
the longitudinal bundle includes an inner radial portion and an outer radial portion, the inner radial portion configured to receive an image inside a field-of-view from the image intensifier tube, and the outer radial portion configured to be outside of the field-of-view of the image,
the outer radial portion has a radial dimension of $D_2$ and the groove has a radial depth of $D_1$, and
$D_1$ has a value less than or equal to $D_2$.

9. The night vision device of claim 8 wherein
the indicator is positioned radially away from the outer surface of the fiber optic screen by approximately 1-2 times the value of $D_2$.

10. A night vision device comprising
a photocathode and an anode configured to provide an image to a user, the anode including a fiber optic screen for channeling light from the image toward an eyepiece of the user,
the fiber optic screen including a longitudinal bundle of multiple optical fibers, the optical fibers providing the channeling of the light,
a groove formed in the fiber optic screen and extending transversely to the longitudinal bundle, and
an indicator positioned adjacent to the outer surface of the bundle and proximate to the groove,
wherein the groove is configured to redirect light emitted from the indicator toward the eyepiece for viewing by the user.

11. The night vision device of claim 10 wherein
the indicator is part of a power supply, and
the indicator is positioned to emit light from the power supply and toward the groove.

12. The night vision device of claim 10 wherein
the indicator is positioned radially further away from a center of the longitudinal bundle and radially adjacent to the groove.

13. The night vision device of claim 10 wherein
the groove includes a surface of end portions of multiple cut optical fibers, and
the groove is configured to redirect the light emitted from the indicator toward the user by way of the end portions of the multiple cut optical fibers.

14. The night vision device of claim 10 wherein
the longitudinal bundle includes an inner radial portion and an outer radial portion, the inner radial portion configured to receive the image inside a field-of-view from the photocathode, and the outer radial portion configured to be outside of the field-of-view of the image,
the outer radial portion has a radial dimension of $D_2$ and the groove has a radial depth of $D_1$, and
$D_1$ has a value less than or equal to $D_2$.

15. The night vision device of claim 14 wherein
the indicator is positioned radially away from the outer surface of the fiber optic screen by approximately 1-2 times the value of $D_2$.

16. The night vision device of claim 10 wherein
the indicator includes two or more light emitting diodes (LEDs),
the groove is formed circumferentially around the fiber optic screen, and
the LEDs are spaced circumferentially around the groove.

17. A method of providing an alert to a user of a night vision device, the night vision device including a fiber optic screen for directing light from an image toward the user, and a power supply for powering the night vision device, the method comprising the steps of:
(a) configuring the power supply for assembly with the fiber optic screen;
(b) placing at least one indicator to provide the alert at a surface of the power supply;
(c) cutting a groove in the outer surface of the fiber optic screen; and
(d) aligning, during assembly, the groove with the indicator so that light emitted from the indicator impinges into the groove;
wherein after alignment of the groove with the indicator, the light impinging into the groove is redirected by the fiber optic screen toward the user.

18. The method of claim 17 wherein
step (c) includes cutting the groove transversely to a longitudinal dimension of the fiber optic screen, and
cutting the groove to a radial depth that is smaller than or equal to a radial width of an outer radial portion of the fiber optic screen, the outer radial portion including a bundle of multiple optical fibers that are outside a field-of-view of the night vision device.

19. The method of claim 18 wherein
cutting the groove includes forming a cut that extends circumferentially around the outer surface of the fiber optic screen,
step (b) includes placing two or more indicators at the surface of the power supply, each providing a different alert to the user, and
step (d) includes aligning the groove with the indicators at spaced intervals around the circumference of the groove.

20. The method of claim 17 wherein
step (c) includes cutting the groove to have a radial dimension of $D_1$, and
step (d) includes spacing the indicator radially away from the outer surface of the fiber optic screen by a distance of 2-4 times the dimension of $D_1$.

* * * * *